US010406676B2

(12) United States Patent
Smith et al.

(10) Patent No.: US 10,406,676 B2
(45) Date of Patent: Sep. 10, 2019

(54) ENERGY RECOVERING LEGGED ROBOTIC DEVICE

(71) Applicant: Sarcos LC, Salt Lake City, UT (US)

(72) Inventors: Fraser M. Smith, Salt Lake City, UT (US); Marc X. Olivier, Salt Lake City, UT (US)

(73) Assignee: Sarcos LC, Salt Lake City, UT (US)

(*) Notice: Subject to any disclaimer, the term of this patent is extended or adjusted under 35 U.S.C. 154(b) by 957 days.

(21) Appl. No.: 14/704,872

(22) Filed: May 5, 2015

(65) Prior Publication Data
US 2015/0321342 A1    Nov. 12, 2015

Related U.S. Application Data

(60) Provisional application No. 61/989,427, filed on May 6, 2014.

(51) Int. Cl.
A61H 1/02    (2006.01)
A61H 3/00    (2006.01)
(Continued)

(52) U.S. Cl.
CPC .......... B25J 9/0009 (2013.01); A61H 1/0237 (2013.01); A61H 3/00 (2013.01);
(Continued)

(58) Field of Classification Search
CPC .... A61H 1/0237–1/0262; A61H 3/00–3/0083; B25J 9/0006
See application file for complete search history.

(56) References Cited

U.S. PATENT DOCUMENTS 2,981,198 A    4/1961 Nettel
3,358,678 A    12/1967 Kulstar
(Continued)

FOREIGN PATENT DOCUMENTS

CN    103610524 A    3/2014
DE    102010029088 A1    11/2011
(Continued)

OTHER PUBLICATIONS

Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Physiological Society, United States.
(Continued)

Primary Examiner — Valerie L Woodward

(57) ABSTRACT

A legged robotic device is disclosed. The legged robotic device can include a plurality of support members coupled together for relative movement defining a plurality of degrees of freedom, which can correspond to degrees of freedom of a human leg. The legged robotic device can also include actuators to apply forces or torques to the support members in the degrees of freedom. In addition, the legged robotic device can include potential energy storage mechanisms associated with the degrees of freedom operable to store potential energy as a result of relative movement of the support members in the degrees of freedom and to provide at least a portion of the stored potential energy to the support members as compensating forces or torques to assist the actuators. In one aspect, elastic potential energy can be stored. A spring rate and/or a zero position of the potential energy storage mechanisms can be dynamically variable.

31 Claims, 5 Drawing Sheets

(51) Int. Cl.
*B25J 9/00* (2006.01)
*B25J 19/00* (2006.01)

(52) U.S. Cl.
CPC .......... *B25J 9/0006* (2013.01); *B25J 19/005* (2013.01); *Y10T 74/20305* (2015.01); *Y10T 74/20317* (2015.01)

(56) References Cited

U.S. PATENT DOCUMENTS

| | | | |
|---|---|---|---|
| 3,449,769 A | 6/1969 | Mizen | |
| 3,759,563 A | 9/1973 | Kitamura | |
| 4,200,596 A | 4/1980 | Iiyama et al. | |
| 4,723,353 A | 2/1988 | Monforte | |
| 4,884,720 A | 12/1989 | Whigham et al. | |
| 5,785,505 A | 7/1998 | Price | |
| 6,641,371 B2 | 11/2003 | Graziani et al. | |
| 7,628,766 B1 | 12/2009 | Kazerooni et al. | |
| 7,883,546 B2 | 2/2011 | Kazerooni et al. | |
| 7,947,004 B2 | 5/2011 | Kazerooni et al. | |
| 8,375,982 B2 | 2/2013 | Gray, Jr. | |
| 8,870,967 B2 | 10/2014 | Herr et al. | |
| 9,295,604 B2 | 3/2016 | Zoss et al. | |
| 2002/0094919 A1* | 7/2002 | Rennex | A61F 5/0102 482/124 |
| 2005/0059908 A1* | 3/2005 | Bogert | A61F 5/0102 601/5 |
| 2006/0064047 A1 | 3/2006 | Shimada et al. | |
| 2006/0197049 A1 | 9/2006 | Hamada et al. | |
| 2007/0129653 A1* | 6/2007 | Sugar | A61H 1/02 601/5 |
| 2009/0036815 A1 | 2/2009 | Ido | |
| 2009/0294238 A1 | 12/2009 | Gilmore | |
| 2010/0094185 A1 | 4/2010 | Amundson et al. | |
| 2010/0241242 A1 | 9/2010 | Herr et al. | |
| 2011/0040216 A1 | 2/2011 | Herr et al. | |
| 2011/0066088 A1 | 3/2011 | Little et al. | |
| 2011/0264230 A1 | 10/2011 | Herr et al. | |
| 2012/0073930 A1 | 3/2012 | Lansberry et al. | |
| 2012/0137667 A1 | 6/2012 | Jacobsen et al. | |
| 2012/0179075 A1 | 7/2012 | Perry et al. | |
| 2012/0216671 A1 | 8/2012 | Gammon | |
| 2013/0192406 A1 | 8/2013 | Godowski | |
| 2013/0226048 A1 | 8/2013 | Unluhisarcikli et al. | |
| 2013/0253385 A1 | 9/2013 | Goffer et al. | |
| 2013/0296746 A1 | 11/2013 | Herr et al. | |
| 2013/0331744 A1 | 12/2013 | Kamon | |
| 2013/0333368 A1* | 12/2013 | Durfee | F01B 11/04 60/370 |
| 2014/0100492 A1 | 4/2014 | Nagasaka | |
| 2014/0190289 A1* | 7/2014 | Zhu | B25J 9/104 74/89.22 |
| 2016/0331572 A1 | 11/2016 | Popovic et al. | |
| 2016/0332302 A1 | 11/2016 | Bingham et al. | |

FOREIGN PATENT DOCUMENTS

| | | |
|---|---|---|
| EP | 2198810 A1 | 6/2010 |
| EP | 2942162 A2 | 11/2015 |
| EP | 2168548 B1 | 10/2016 |
| GB | 686237 A | 1/1953 |
| JP | S34-015764 | 10/1959 |
| JP | S36-005228 | 5/1961 |
| JP | S44-000603 | 1/1969 |
| JP | S50-009803 | 1/1975 |
| JP | S50-006043 | 3/1975 |
| JP | S52-134985 A | 11/1977 |
| JP | S58-113586 A | 7/1983 |
| JP | S62-200600 A | 9/1987 |
| JP | H06-213266 A | 8/1994 |
| JP | H07-5129 Y2 | 2/1995 |
| JP | 2003-103480 A | 4/2003 |
| JP | 2005-118938 A | 5/2005 |
| JP | 2006-051558 A | 2/2006 |
| JP | 2007-130234 A | 5/2007 |
| JP | 2007-252514 A | 10/2007 |
| JP | 2009-023828 A | 2/2009 |
| JP | 2009-219650 A | 10/2009 |
| JP | 2009-240488 A | 10/2009 |
| JP | 2009-268839 A | 11/2009 |
| JP | 2010-110381 A | 5/2010 |
| JP | 2010-110465 A | 5/2010 |
| JP | 2010-142351 A | 7/2010 |
| JP | 2011-193899 A | 10/2011 |
| JP | 2012-501739 A | 1/2012 |
| JP | 2012-125279 A | 7/2012 |
| JP | 2013-022091 A | 2/2013 |
| JP | 2013-090693 A | 5/2013 |
| JP | 5267730 | 8/2013 |
| JP | 2013-248699 A | 12/2013 |
| JP | 2014-054273 A | 3/2014 |
| JP | 2014-073222 A | 4/2014 |
| KR | 2007-0057209 A | 6/2007 |
| KR | 2012-0105194 A | 9/2012 |
| KR | 10-1219795 | 1/2013 |
| KR | 2013-0001409 A | 1/2013 |
| KR | 2013-0045777 A | 5/2013 |
| WO | WO 2003/081762 A1 | 10/2003 |
| WO | WO 2010/025409 A1 | 3/2010 |
| WO | WO 2012/042471 A1 | 4/2012 |
| WO | WO 2017/148499 A1 | 9/2017 |
| WO | WO 2018-118004 A1 | 6/2018 |
| WO | WO 2018-215705 A1 | 11/2018 |

OTHER PUBLICATIONS

Elliott et al., Design of a Clutch-Spring Knee Exoskeleton for Running, Journal of Medical Devices, Sep. 2014, 11 pages, vol. 8, The American Society of Mechanical Engineers, New York City, NY.

Elliott et al., The Biomechanics and Energetics of Human Running using an Elastic Knee Exoskeleton, Jun. 2013, 7 pages, IEEE International Conference on Rehabilitation Robotics, Seattle, WA.

Jafari et al., A Novel Actuator with Adjustable Stiffness (AwAS), Oct. 18-22, 6 pages, 2010, IEEE/RSJ International Conference on Intelligent Robots and Systems, Taiwan.

Kulick, An Unpowered Exoskeleton Springs Into Action: Researchers Increase Walking Efficiency, http://www.cmu.edu/me/news/archive/2015/collins-clutch.html, Apr. 1, 2015, 2 pages, Carnegie Mellon University Mechanical Engineering, Pittsburgh, PA.

Miao et al., Mechanical Design of Hybrid Leg Exoskeleton to Augment Load-Carrying for Walking, International Journal of Advanced Robotic Systems, Mar. 28, 2013, 11 pp., vol. 10, Intech open science open minds, Europe.

Mombaur et al., HEiKA-EXO: Optimization-based development and control of an exoskeleton for medical applications, http://typo.iwr.uni-heidelberg.de/groups/org/research/heika-exo/, Optimization in Robotics & Biomechanics, Oct. 20, 2014, 3 pages, Germany.

Pan, Improved Design of a Three-degree of Freedom Hip Exoskeleton Based on Biomimetic Parallel Structure, Jul. 2011, 132 pages, University of Ontario Institute of Technology, Canada.

Pratt et al., The RoboKnee: An Exoskeleton for Enhancing Strength and Endurance During Walking, International Conference on Robotics & Automation, Apr. 2004, 6 pages, IEEE, New Orleans, LA.

Searchmap Blog, Scientists Develop Mechanical Spring-Loaded Leg Brace to Improve Walking, http://www.searchmap.eu/blog/scientists-develop-mechanical-spring-loaded-leg-brace-to-improve-walking/, Apr. 1, 2015, 5 pages, Searchmap Blog.

Seppala, These exoskeleton heels could help stroke victims walk again, https://www.engadget.com/2015/04/02/feet-exoskeletons/, Apr. 2, 2015, Engadget, San Francisco, CA.

Siddharth et al., Design and Analysis of a 1-DOF Walking Mechanism, http://siddharthswaminathan.in/files/WalkingMechanism.pdf, Nov. 2012, 7 pages, India.

Suitx, Phoenix Medical Exoskeleton, https://www.suitx.com/phoenix-medical-exoskeleton, 3 pages, to the best of the applicant's knowledge article was available before the application filing date of May 5, 2015, US Bionics, Inc., Berkeley, CA.

(56) References Cited

OTHER PUBLICATIONS

Suleiman, Engineering an affordable exoskeleton, Phys.org, https://phys.org/news/2014-06-exoskeleton.html, Jun. 12, 2014, 5 pages, Science X, network.

Vanderborght et al., Variable impedance actuators: A review, Robotics and Autonomous Systems, Dec. 2013, 14 pages, vol. 61, Issue 12, Elsevier, Netherlands.

Walsh, Biomimetic Design of an Under-Actuated Leg Exoskeleton For Load-Carrying Augmentation, Massachusetts Institute of Technology, Feb. 2006, 97 pages, Massachusetts.

Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.

EP Search Report for EP Application No. 15166668.2, dated Oct. 19, 2015, 6 pages.

EP Search Report for EP Application No. 15166669.0, dated Dec. 10, 2015, 12 pages.

EP Search Report for EP Application No. 15166667.4, dated Feb. 19, 2016, 11 pages.

EP Search Report for EP Application No. 15166664.1, dated Apr. 15, 2016, 9 pages.

EP Search Report for EP Application No. 17201464.9, dated Apr. 26, 2018, 8 pages.

EP Search Report for EP Application No. 17201467.2, dated Apr. 26, 2018, 7 pages.

EP Search Report for EP Application No. 17201466.4, dated Apr. 30, 2018, 8 pages.

Hauser et al., JammJoint: A Variable Stiffness Device Based on Granular Jamming for Wearable Joint Support, IEEE Robotics and Automation Letters, Apr. 2017, 7 pages, vol. 2, Issue 2, IEEE, Piscataway, NJ.

Zubrycki et al., Novel haptic glove-based interface using jamming principle, Proceedings of the $10^{th}$ International Workshop on Robot Motion and Control, Jul. 6-8, 2015, 6 pages, IEEE, Poland.

EP Search Report for EP Application No. 18210380.4, dated Mar. 27, 2019, 9 pages.

EP Search Report for EP Application No. 18213196.1, dated Apr. 8, 2019, 11 pages.

\* cited by examiner

ENERGY RECOVERING LEGGED ROBOTIC DEVICE

RELATED APPLICATIONS

This application claims the benefit of U.S. Provisional Application No. 61/989,427, filed May 6, 2014, which is incorporated by reference herein in its entirety.

BACKGROUND

A wide variety of exoskeleton, humanoid, and other legged robot systems have been disclosed, although not many have actually been constructed. The fundamental technical problem to be solved for such systems, where energetic autonomy is concerned, is power. Two options are available: use a high-output power supply that efficiently uses an energy dense source and that can meet the demands of the robotic system, or use less power. The first option lacks practicality, inasmuch as portable power remains a challenge, which leaves the second option. Accordingly, the exoskeletons or ambulatory robots in existence are not capable of providing high force and high speed outputs for prolonged periods of time. In other words, the power issue has been an insurmountable obstacle, with the typical solution being to reduce the power output capabilities of the system.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
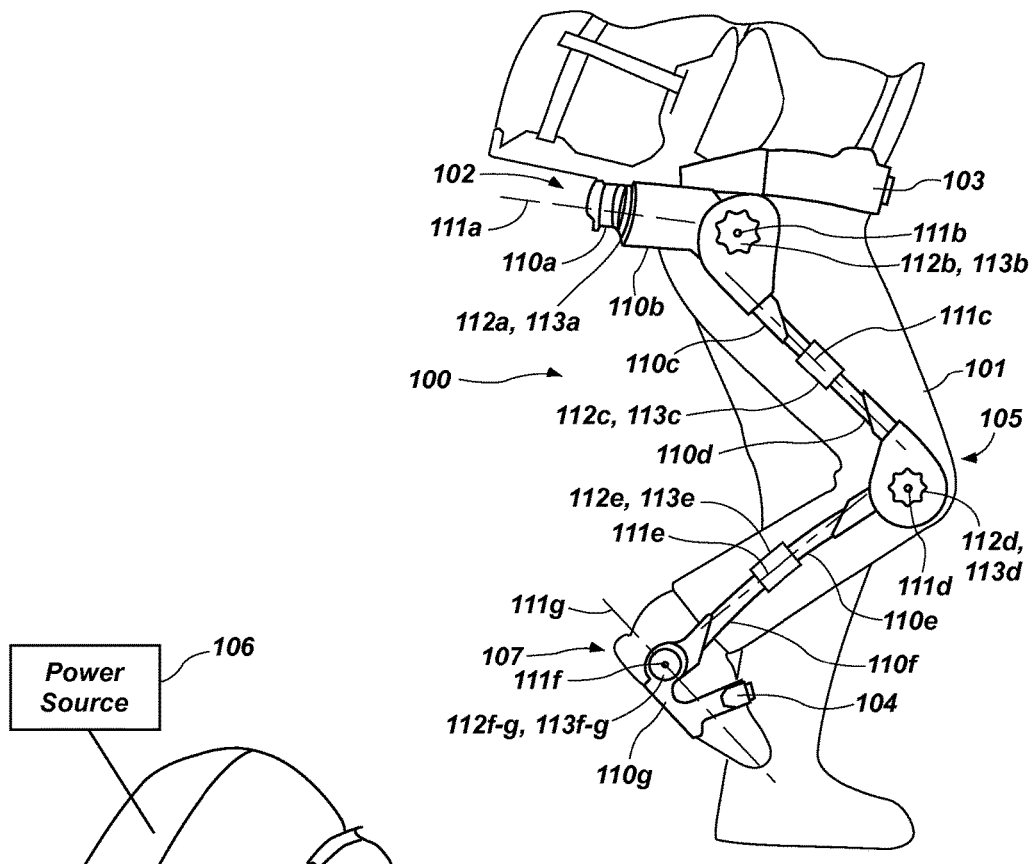
FIGS. 1A and 1B are illustrations of a legged robotic device in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term ""substantially"" refers to the complete or nearly complete extent or degree of an action, characteristic, property, state, structure, item, or result. For example, an object that is ""substantially"" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of ""substantially"" is equally applicable when used in a negative connotation to refer to the complete or near complete lack of an action, characteristic, property, state, structure, item, or result.

As used herein, ""adjacent"" refers to the proximity of two structures or elements. Particularly, elements that are identified as being ""adjacent"" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In order to improve an exoskeleton, humanoid, or other legged robot system's power output and endurance capabilities with limited power available, the efficiency of such systems must be one of the focuses of improvement. Accordingly, a legged robotic device is disclosed that improves efficiency over a typical robotic system. In one aspect, a potential energy storage mechanism is included to store energy that would otherwise be lost and provide the stored energy for use by the device. The legged robotic device can include a plurality of support members coupled together for relative movement defining a plurality of degrees of freedom, at least one of the plurality of degrees of freedom corresponding to at least one degree of freedom of a human leg. The legged robotic device can also include an actuator to apply a force or a torque to the support members in the at least one of the plurality of degrees of freedom. Additionally, the legged robotic device can include a potential energy storage mechanism associated with the at least one of the plurality of degrees of freedom operable to store potential energy as a result of relative movement of the support members in the at least one of the plurality of degrees of freedom and to provide at least a portion of the stored potential energy to the support members as a compensating force or torque to assist the actuator. A spring rate and/or a zero position of the potential energy storage mechanism can be dynamically variable.

In one aspect, a legged robotic device is disclosed that can include a first support member coupled to a second support member for relative movement defining a first degree of freedom corresponding to a degree of freedom of a knee of a human leg. The legged robotic device can also include a first actuator to apply a force or a torque to the first and second support members in the first degree of freedom. In"

addition, the legged robotic device can include a first potential energy storage mechanism associated with the first degree of freedom operable to store potential energy as a result of relative movement of the first and second support members in the first degree of freedom and to provide at least a portion of the stored potential energy to the first and second support members as a compensating force or torque to assist the first actuator. A spring rate and/or a zero position of the first potential energy storage mechanism can be dynamically variable.

In yet another aspect, a legged robotic device is disclosed that can include a first support member coupled to a second support member for relative movement defining a first degree of freedom corresponding to a degree of freedom of a hip of a human leg. The legged robotic device can also include a first actuator to apply a torque to the first and second support members in the first degree of freedom. Additionally, the legged robotic device can include a first potential energy storage mechanism associated with the first degree of freedom operable to store potential energy as a result of relative movement of the first and second support members in the first degree of freedom and to provide at least a portion of the stored potential energy to the first and second support members as a compensating torque to assist the first actuator. A spring rate and/or a zero position of the first potential energy storage mechanism can be dynamically variable.

Figure 1B:
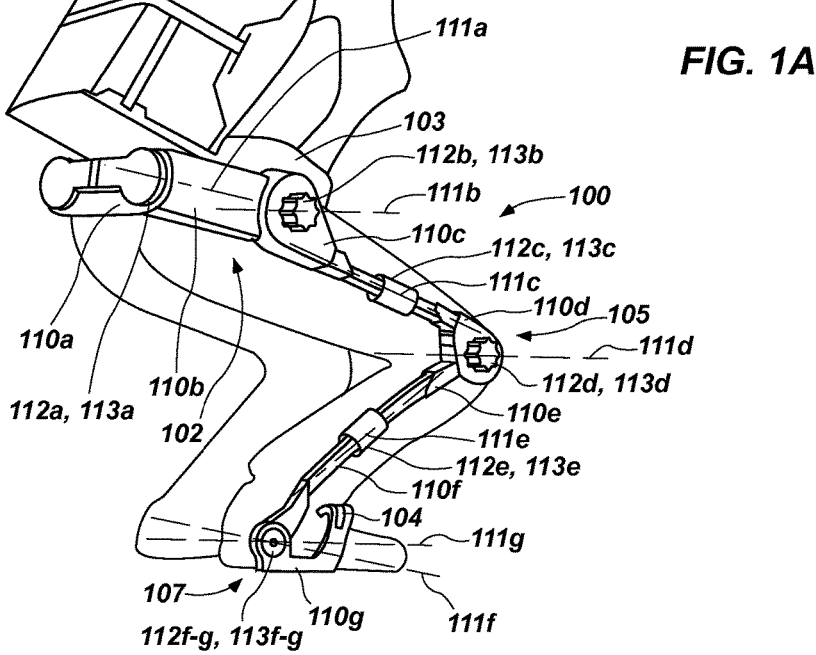

One example of a legged robotic device 100 is illustrated in FIGS. 1A and 1B. The legged robotic device 100 can be configured as an exoskeleton structure for attachment to a human body, as a humanoid robot or any other legged robotic device and can be used in applications relevant to the military, first responders, the commercial sector, etc. The legged robotic device 100 can comprise any suitable configuration in accordance with the concepts discussed herein. In one example, as illustrated in the figures, the legged robotic device 100 can comprise a plurality of support members 110a-g coupled together for relative movement defining a plurality of degrees of freedom. For example, the support members 110a-g can be rotatably coupled together defining rotational degrees of freedom about one or more axes 111a-g, although translational degrees of freedom are possible. In one aspect, two or more of the support members 110a-g can be coupled together at a joint. A joint can accommodate one or more degrees of freedom. For example, the support members 110b, 110c can be coupled together to form a single degree of freedom and the support members 110f, 110g can be coupled together (i.e., by a universal or ball joint) to form degrees of freedom about axes 111f, 111g. Such single or multi-degree of freedom joints can be provided at any suitable location of the device 100. One or more of the degrees of freedom, such as the rotational degrees of freedom about the axes 111a-g, can correspond to one or more degrees of freedom of a human leg 101, such as hip flexion/extension, hip abduction/adduction, hip medial/lateral rotation, knee flexion/extension, ankle flexion/extension, ankle inversion/eversion, and ankle medial/lateral rotation.

For example, as illustrated in the figures, the support member 110e can be coupled to the support member 110d for relative movement defining a degree of freedom corresponding to a degree of freedom of a knee (i.e., knee flexion/extension). The support member 110c can be coupled to the support member 110d for relative movement defining a degree of freedom corresponding to a degree of freedom of a hip (i.e., hip medial/lateral rotation). The support member 110b can be coupled to the support member 110c for relative movement defining a degree of freedom corresponding to another degree of freedom of the hip (i.e., hip flexion/extension). The support member 110a can be coupled to the support member 110b for relative movement defining a degree of freedom corresponding to a yet another degree of freedom of the hip (i.e., hip abduction/adduction).

A human user or operator may use or interact with the legged robotic device 100 by placing his or her feet into a foot portion 107 of the device, where the feet of the operator can be in contact with a corresponding force sensor. Portions of the human operator can also be in contact with force sensors disposed on various locations of the legged robotic device 100. For example, a hip portion 102 of the legged robotic device 100 can have a force sensor configured to interact with the operator's hip. The operator can be coupled to the legged robotic device 100 by a waist strap 103 or other appropriate coupling device. The operator can be further coupled to the legged robotic device 100 by a foot strap 104. In one aspect, a force sensor can be located about a knee portion 105 of the legged robotic device 100 near a knee of the operator. While reference is made to force sensors disposed at specific locations on or about the legged robotic device 100, it should be understood that force sensors can be strategically placed at numerous locations on or about the legged robotic device 100 in order to facilitate proper operation of the legged robotic device 100.

The legged robotic device 100 can also comprise one or more actuators 112a-g to apply a force or a torque to the support members 110a-g in the degrees of freedom, such as any of the rotational degrees of freedom about the axes 111a-g. For example, as illustrated in the figures, the actuator 112a can apply a force or a torque to the support members 110a, 110b in the degree of freedom about the axis 111a. The actuator 112b can apply a force or a torque to the support members 110b, 110c in the degree of freedom about the axis 111b. The actuator 112c can apply a force or a torque to the support members 110c, 110d in the degree of freedom about the axis 111c. The actuator 112d can apply a force or a torque to the support members 110d, 110e in the degree of freedom about the axis 111d. The actuator 112e can apply a force or a torque to the support members 110e, 110f in the degree of freedom about the axis 111e. The actuator 112f can apply a force or a torque to the support members 110f, 110g in the degree of freedom about the axis 111f. The actuator 112g can apply a force or a torque to the support members 110f, 110g in the degree of freedom about the axis 111g.

In addition, a potential energy storage mechanism 113a-g can be associated with one or more of the degrees of freedom, such as any of the rotational degrees of freedom about the axes 111a-g. The potential energy storage mechanisms 113a-g can be operable to store potential energy as a result of relative movement of the support members 110a-g in the degrees of freedom and to provide at least a portion of the stored potential energy to the support members 110a-g as a compensating force or torque to assist the actuators 112a-g. For example, as illustrated in the figures with regard to a degree of freedom corresponding to knee flexion/extension, the potential energy storage mechanism 113d associated with the degree of freedom about the axis 111d can be operable to store potential energy as a result of relative movement of the support members 110d, 110e in the degree of freedom and to provide at least a portion of the stored potential energy to the support members 110d, 110e as a compensating force or torque to assist the actuator 112d.

With regard to degrees of freedom corresponding to hip degrees of freedom, the potential energy storage mechanism 113c associated with the degree of freedom about the axis 111c can be operable to store potential energy as a result of relative movement of the support members 110c, 110d in the degree of freedom and to provide at least a portion of the stored potential energy to the support members 110c, 110d as a compensating force or torque to assist the actuator 112c. The potential energy storage mechanism 113b associated with the degree of freedom about the axis 111b can be operable to store potential energy as a result of relative movement of the support members 110b, 110c in the degree of freedom and to provide at least a portion of the stored potential energy to the support members 110b, 110c as a compensating force or torque to assist the actuator 112b. The potential energy storage mechanism 113a associated with the degree of freedom about the axis 111ia can be operable to store potential energy as a result of relative movement of the support members 110a, 110b in the degree of freedom and to provide at least a portion of the stored potential energy to the support members 110a, 110b as a compensating torque to assist the actuator 112a. With regard to degrees of freedom corresponding to ankle degrees of freedom, the potential energy storage mechanism 113e associated with the degree of freedom about the axis 111e can be operable to store potential energy as a result of relative movement of the support members 110e, 110f in the degree of freedom and to provide at least a portion of the stored potential energy to the support members 110e, 110f as a compensating force or torque to assist the actuator 112e. The potential energy storage mechanism 113f, 113g associated with the degrees of freedom about the axes 111f, 111g can be operable to store potential energy as a result of relative movement of the support members 110f, 110g in the degrees of freedom and to provide at least a portion of the stored potential energy to the support members 110f, 110g as a compensating force or torque to assist the actuators 112f, 112g.

Thus, upon putting energy into the potential energy storage mechanisms 113a-g (e.g., such as bending the leg at the knee joint), at least a portion of the energy can be recovered and applied to the load. For example, in an upright position or non-energized state, the user or wearer would not feel the load as the load is transferred through the support members to the ground. As the potential energy storage mechanisms 113a-g are energized (e.g., when the wearer bends down), energy is put into the potential energy storage mechanisms 113a-g. Upon release, or upon the user standing upright, the energy is recovered, and put back into the load. This is one example of a situation where potential energy storage mechanisms 113a-g can be used to reduce the amount of work done by the robotic device. In other words, the user is using his gravity induced weight to put energy into the potential energy storage mechanisms 113a-g. When it is desired to get the energy back, the user stands or otherwise moves to extract energy from, or de-energize, the potential energy storage mechanisms 113a-g so now the amount of work the user and the robotic device needs to do is reduced by the amount of energy put into the potential energy storage mechanisms 113a-g. Stated differently, energy put into the potential energy storage mechanisms 113a-g can be retrieved or recovered and used to assist the actuators 112a-g, thereby reducing energy consumption by preserving energy for use that would otherwise have been wasted. Providing the legged robotic device 100 with potential energy storage mechanisms 113a-g can therefore increase efficiencies of the device.

The actuators 112a-g can comprise any suitable actuator, such as a hydraulic actuator, a pneumatic actuator, and/or an electric actuator. In one aspect, an actuator can be remotely located relative to the joint or degree of freedom in which the actuator will provide force or torque. For example, an actuator for an ankle degree of freedom can be located on a support member near a pelvis or thigh of the user, and can have a power transfer mechanism, such as a cable routed through a neutral axis of an intermediated degree of freedom (e.g., knee flexion/extension), to remotely actuate the ankle degree of freedom. Such a configuration can locate the mass of the actuator near a center of rotation (i.e., the hip) to reduce the distal mass and moment of inertia of a legged robotic device.

The potential energy storage mechanisms 113a-g can comprise any suitable type of potential energy storage mechanism and can be energized in any suitable manner. In one aspect, the potential energy storage mechanisms 113a-g can comprise any suitable spring, such as a tension spring, a compression spring, a torsion spring, a spiral torsion spring, a pneumatic spring (e.g., air or nitrogen cylinder), a cantilever spring, a constant force spring, a negator spring, an elastomeric material, a volute spring, a coil spring, a flat spring, a hydraulic accumulator, a magnetic spring, and/or a bow spring. In another aspect, the potential energy storage mechanisms 113a-g can comprise any suitable material or medium to facilitate potential energy storage and recovery. Thus, a solid elastic member (e.g., made of spring steel or elastomeric material) and/or a pneumatic spring utilizing a gas can be utilized. In other words, any type of spring element can be used that can store energy and provide the stored energy to exert a force and/or a torque on support members or assist an actuator. As described further below, the potential energy storage mechanisms 113a-g can be configured to store elastic potential energy and can have elastic behaviors dynamically modified or tuned to achieve a desired result for a given application or scenario. In addition, energy dissipation characteristics of the potential energy storage mechanisms 113a-g can also be varied dynamically.

In one aspect, one or more of the actuators 112a-g can be undersized (e.g., having less output capabilities than would otherwise be needed) for a maximum load requirement as compared to the size of the actuators needed without the existence of the potential energy storage mechanism. For example, by incorporating and using potential energy storage mechanisms 113a-g as described herein, an actuator can be sized to provide approximately half of the maximum force or torque requirement for a given degree of freedom. This reduction in actuator capability can reduce the size of the actuators as well as the power required to operate the actuators. It should be recognized, however, that the actuators of any suitable capability can be utilized. A power source 106 to power the actuator and/or other components of the legged robotic device 100 (i.e., electronics) can be supported about the robotic device, such as on an attached framework or in a storage or cargo feature of the legged robotic device 100.

In one aspect, each of the potential energy storage mechanisms 113a-g can be combined or associated with an actuator. For example, the actuator 112b and the potential energy storage mechanism 113b can be located at the hip, such as associated with a hip flexion/extension degree of freedom of the user's leg. The actuator 112b can be actuated to energize the potential energy storage mechanism 113b, such as when the user lifts the leg in hip flexion to ascend a step. In other words, when the actuator 112b is actuated to lift the leg, energy is put into the potential energy storage mechanism 113b, thus energizing the potential energy storage mechanism 113b. This energy can be recovered to assist the actuator 112b in extending the leg at the hip to raise the operator and the device 100 onto the step. Thus, energy can be put into the potential energy storage mechanisms 113a-g while also actuating the leg of the robot and the user's leg. The legged robotic device 100 can be configured to provide energy storage/recovery alone or energy storage/recovery coupled with actuation to make the user more efficient and stronger. For example, a user can be more efficient at carrying a load, more efficient at walking, more efficient at climbing, more efficient at running, etc.

In one aspect, an actuator and a potential energy storage mechanism can be combined into a unit or module that can be disposed or located at a desired joint or coupling of support members of the legged robotic device 100. For example, the actuator 112d and the potential energy storage mechanism 113d can be combined into a single unit or module and can have a common housing and standardized interfaces for coupling with support members. In one aspect, an actuator and a potential energy storage mechanism can be specifically configured for use with a degree of freedom corresponding to a particular degree of freedom of the leg, as described in more detail below. For example, the actuator 112d and the potential energy storage mechanism 113d can be configured specifically for use with a joint forming a degree of freedom corresponding to knee flexion/extension. Such modules can also be tailored for the hip and ankle degrees of freedom.

In one aspect, the potential energy storage mechanisms 113a-g can be configured to bias the legged robotic device 100 into an upright, standing position, thus making the standing position the default position. This can make the device more convenient to don and doff as well as increase safety because the device will not collapse with a loss of power. In a particular aspect, the potential energy storage mechanisms 113a-g can be configured such that the actuators 112a-g must be actuated or engaged to accomplish a motion, in addition to force provided by the user. For example, the potential energy storage mechanisms 113a-g can be configured such that the actuators 112a-g are caused to be actuated or engaged to accomplish a squat motion, in addition to the downward force exerted by gravity from the user. Such a configuration of the potential energy storage mechanisms 113a-g can reduce the required output capacity of the actuators 112a-g to what is required to compensate for inertially induced loads or changes in overall potential energy of the system, rather than to compensate for the weight of the system itself. This reduced output capacity of the actuators can lead to reduced actuator size and weight as well as the associated actuator systems (e.g., hydraulic pumps, valves, lines, etc.), which can reduce or minimize the weight of the overall legged robotic device 100, thereby reducing power consumption and improving efficiency.

The use of the potential energy storage mechanisms 113a-g can have a broad span in terms of increasing a person's capability. The potential energy storage mechanisms 113a-g can be used to increase a user's capability of carrying loads, to increase the user's endurance with or without loads, to facilitate a user being able to run as fast or faster than normal, to walk more efficiently, etc. These are all variables and benefits the potential energy storage mechanisms 113a-g allows to be introduced into the robotic device. In addition, using potential energy storage mechanisms 113a-g the robot can be configured to perform a function of energy in and energy out at a higher frequency than would otherwise be possible. In one aspect, the actuators 112a-g and/or the potential energy storage mechanisms 113a-g can be configured to recover energy or facilitate energy extraction, which can be used when decelerating the support members 110a-g of the legged robotic device 100, particularly when loaded. For example, during normal human walking the knee joint follows knee joint torque versus position trajectories (see FIG. 4) where the actuator torque decelerates the joint angular and/or linear velocity. When this happens, energy may be dissipated by an energy dissipation mechanism as described herein, such as a brake (e.g., clutch), a pneumatic mechanism, a hydraulic mechanism, etc. Alternatively, this energy can be stored in the potential energy storage mechanisms 113a-g as described herein, such as a spring, a pneumatic mechanism, a hydraulic mechanism, etc., and reused later, thereby increasing the system efficiency.

The potential energy storage mechanisms 113a-g facilitates a reduction in energy consumption by the robot. Without the potential energy storage mechanisms 113a-g, all the energy would have been generated anew and much wasted. The legged robotic device 100 of the present disclosure is similar to the human body having tendons and ligaments that function as potential energy storage/recovery elements. For example, when a person jumps energy is extracted out of the potential energy storage/recovery elements (tendons, ligaments, and bones). In addition, when a person flexes muscles, energy is being put into the potential energy storage/recovery elements (tendons and ligaments and bones), later to be extracted. In this way, the human body is able to achieve higher rate and higher load performance. One example of this is moving the arm in a manner so as to put elastic potential energy into the tendons, ligaments, and muscles of the shoulder to optimize the throwing of a ball at a higher speed. The robot of the present disclosure can be configured to function in a similar manner.

In another aspect, the robot can be configured to perform various regimes and cross regimes. For example, the robot can be configured with potential energy storage mechanisms 113a-g that are tailored to a person's performance in various regimes and cross regimes, such as a potential energy storage mechanism used for walking, but which is also good for helping carrying a load. In some cases, potential energy storage mechanisms that facilitate high rate motions may be inconsistent with potential energy storage mechanisms needed for lower rate motions, so it is contemplated that the robot can comprise a strategic number and type of potential energy storage mechanisms, and that these can be strategically implemented and located.

Figure 2A:
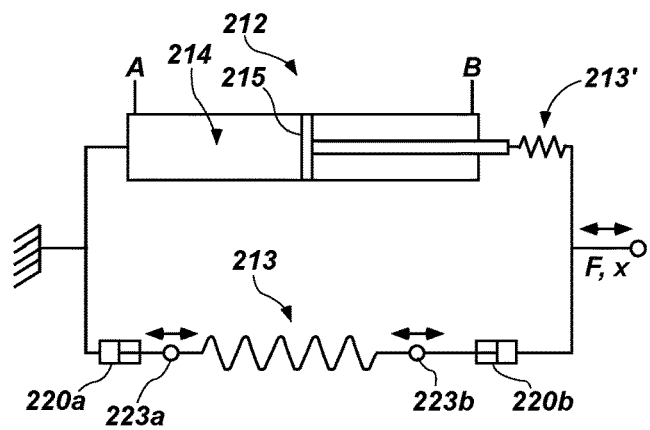
FIG. 2A is an illustration of an actuator and potential energy storage mechanism configuration in accordance with an example of the present disclosure.
Figure 2B:
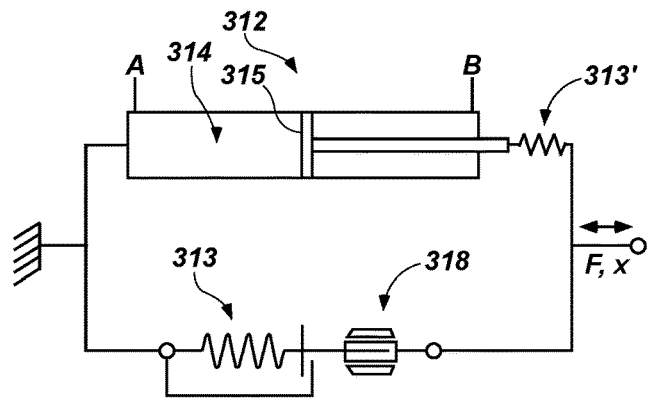
FIG. 2B is an illustration of an actuator and potential energy storage mechanism configuration in accordance with another example of the present disclosure.
Figure 2C:
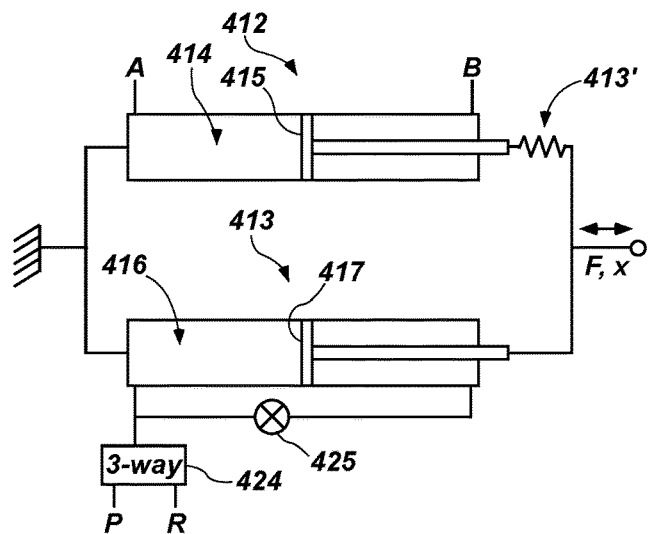
FIG. 2C is an illustration of an actuator and potential energy storage mechanism configuration in accordance with yet another example of the present disclosure.

FIGS. 2A-2C illustrate several examples of actuator and potential energy storage mechanisms configurations that can be utilized in the legged robotic device 100 of FIGS. 1A and 1B. For example, as shown in FIG. 2A, an actuator 212 and a potential energy storage mechanism 213 can be arranged in parallel. This configuration can be well-suited to provide a preload force or torque to counteract a moment inherent in the legged robotic device as a result of the relative positioning of the device about the human user. In one aspect, coupling locations of support members may be laterally offset about the user to form degrees of freedom corresponding to hip abduction/adduction and hip medial/lateral rotation, for example, which may induce moments at the coupling locations. Utilizing the potential energy storage mechanism 213 to provide a preload force or torque to support members can therefore facilitate operating a legged robotic device at lower pressure and/or facilitate use a smaller, more efficient actuator. Although this configuration can be utilized at any suitable location, this configuration can be particularly beneficial at degrees of freedom corresponding to hip flexion/extension, hip abduction/adduction, and/or hip medial/lateral rotation. As described in more detail below, such force or torque preload bias, as well as the compliance of the potential energy storage mechanism 213, can be dynamically tunable to achieve a desired result. FIG. 2A also illustrates an additional or alternative potential energy storage mechanism 213', which may be of any suitable configuration described herein, arranged in series with the actuator 212. Thus, potential energy storage mechanisms can be arranged in series and/or in parallel with an actuator at any given joint.

Figure 3A:
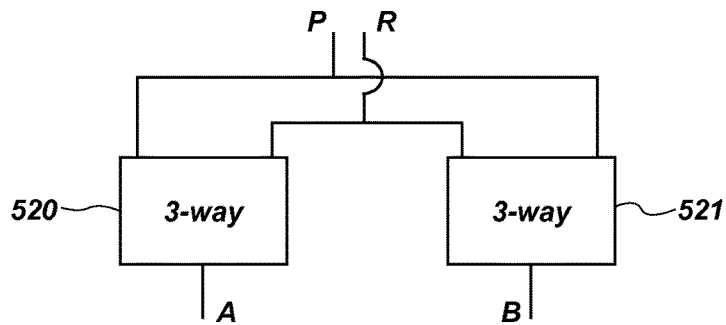
FIG. 3A is an illustration of a valve arrangement that can be used to control hydraulic and/or pneumatic components of a legged robotic device in accordance with an example of the present disclosure.
Figure 3B:
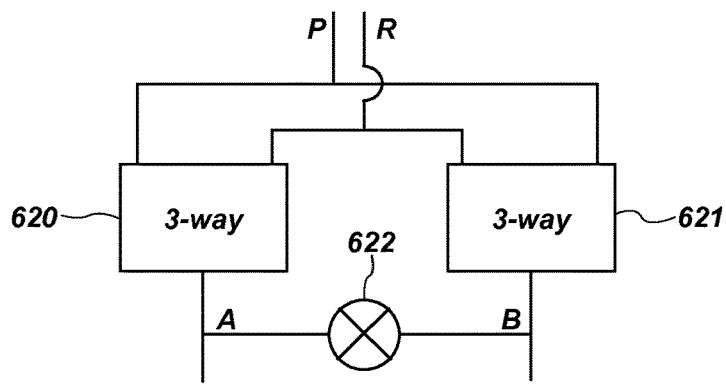
FIG. 3B is an illustration of a valve arrangement that can be used to control hydraulic and/or pneumatic components of a legged robotic device in accordance with another example of the present disclosure.
Figure 3C:
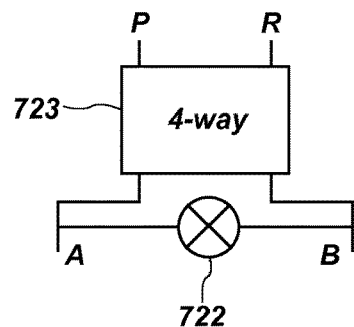
FIG. 3C is an illustration of a valve arrangement that can be used to control hydraulic and/or pneumatic components of a legged robotic device in accordance with yet another example of the present disclosure.

In one aspect, the actuator 212 can be a hydraulic actuator, which can be configured as a double acting actuator with fluid couplings A, B to a chamber 214 on opposite sides of a piston 215. The A and B sides of the actuator 212 can be controlled with one or more valves, examples of which are illustrated in FIGS. 3A-3C, to control operation of the actuator 212. In one aspect, the actuator 212 can be selectively disengaged or configured for free and unrestrained movement, such as by operation of a valve. In another aspect, the hydraulic actuator can be configured to selectively function as a hydraulic damper. Thus, the same device or component can be utilized alternately as an actuator and a damper to control movement of support members in a degree of freedom of the legged robotic device.

The potential energy storage mechanism 213 can comprise any suitable type of spring in any combination. In one aspect, a spring rate of the potential energy storage mechanism 213 can be dynamically variable. The spring rate of the potential energy storage mechanism 213 can be dynamically changed in any suitable manner. For example, a constraint location on a mechanical spring can vary to effectively change the spring rate. For instance, a spring cantilevered from a support can be constrained at a variable distance from the support in order to change the spring rate. A spiral torsion spring can be similarly constrained to change the spring rate. In a particular example, potential energy storage mechanism 213 can comprise a negator-type spring located co-axially with a joint axis. Such a spring has the benefit of accommodating adjustable tension to allow the user to tune the spring tension to optimize the elastic behavior with a given load.

In one aspect, a zero position of the potential energy storage mechanism 213 can be dynamically variable. For example, one or both of anchor locations 223a, 223b can be moved to adjust a zero or neutral position of the potential energy storage mechanism 213. The position of the anchor locations 223a, 223b can be controlled by one or more actuators 220a, 220b. Dynamically changing the zero position can therefore change a position at which the potential energy storage mechanism 213 will begin to store energy and a position at which the stored energy will be depleted. Thus, dynamically changing the zero position of the potential energy storage mechanism 213 can influence the relative movement of support members, which can be manipulated to advantage in improving performance of the legged robotic device. In one aspect, changing a relative position of the anchor locations 223a, 223b can store or release energy independent of relative movement of the support members. In another aspect, changing a relative position of the anchor locations 223a, 223b can vary a preload in the potential energy storage mechanism 213. Thus, the preload of the potential energy storage mechanism 213 can be dynamically variable.

In one aspect, one or both of the actuators 220a, 220b can serve as or represent a damper to resist movement of the support members in a degree of freedom. Any suitable damper can be utilized, such as a hydraulic damper, a pneumatic damper, a mechanical damper, and/or an electrical damper (e.g., an electrical generator). In a particular aspect, a damping coefficient of the damper can be dynamically variable, such as by controlling flow through the damper with one or more valves. The ability to dynamically vary the characteristics and functions of the actuator 212 and the potential energy storage mechanism 213 can enable tunable energy storage/recovery and actuation capabilities.

As shown in FIG. 2B, a potential energy storage mechanism 313 can be arranged in series with a clutch 318. The potential energy storage mechanism 313 and the clutch 318 can be arranged in parallel with an actuator 312. This configuration can be used to allow potential energy to be stored and recovered during part of a gait cycle, and permit support members to follow a quasi-ballistic (passive dynamics) torque versus joint angle trajectory (e.g. during leg swing). Thus, although this configuration can be utilized at any suitable location, this configuration can be utilized effectively for degrees of freedom corresponding to knee flexion/extension and/or hip flexion/extension due to the ease of dynamically tuning compliance with this configuration. FIG. 2B also illustrates an additional or alternative potential energy storage mechanism 313', which may be of any suitable configuration described herein, arranged in series with the actuator 312. Thus, potential energy storage mechanisms can be arranged in series and/or in parallel with an actuator at any given joint.

In one aspect, the clutch 318 can be used to selectively engage and disengage the potential energy storage mechanism 313. The actuator 312 can be selectively disengaged or configured for free and unrestrained movement. For example, a hydraulic actuator can be configured to facilitate free movement of a piston 315 within a chamber 314 of the hydraulic actuator 312 to selectively disengage the hydraulic actuator. Thus, selective disengagement of the potential energy storage mechanism 313 and the hydraulic actuator can facilitate free relative movement of the support members in a degree of freedom.

The clutch can be any suitable type of clutch. Although not explicitly shown in this figure, the spring rate, zero position, and/or preload of the potential energy storage mechanism 313 can be varied, as described above with reference to FIG. 2A.

FIG. 2C illustrates an actuator 412 and a potential energy storage mechanism 413 arranged in parallel. As with other examples, the actuator 412 can be a hydraulic actuator, which can be selectively disengaged or configured for free and unrestrained movement and/or serve as a damper, such as by controlling the movement of a piston 415 within a chamber 414 by fluid controlled by one or more valves. The potential energy storage mechanism 413 is shown as a pneumatic spring. The pneumatic spring can be configured with fluid couplings to a chamber 416 on opposite sides of a piston 417. Gas can be introduced or evacuated from the chamber 416 using one or more valves 424, 425. The valve 424 can be a three-way valve connecting the pneumatic spring to a pressure source and a return tank. The valve 425 can regulate gas flow into and out of one side of the chamber 416. In one aspect, gas flow to and from the opposite sides of the piston 417 in the potential energy storage mechanism 413 can be controlled with the example valves illustrated in FIGS. 3A-3C to change the properties of the potential energy storage mechanism 413 and/or reconfigure the potential energy storage mechanism 413 for other uses or functions.

Thus, in one aspect, a spring rate of the potential energy storage mechanism 413 can be dynamically variable by changing the gas pressure in the chamber by controlling the valves 424, 425. Once a desired pressure or spring rate has been achieved, both the valves 424, 425 can be closed to maintain the pressure for as long as desired, such as a long period of time. In another aspect, a zero position of the potential energy storage mechanism 413 can be dynamically variable by controlling the valves 424, 425 to move the piston to a desired location within the chamber. In yet another aspect, the potential energy storage mechanism 413 can serve as a pneumatic damper by controlled release of gas from the chamber using the valves 424, 425.

Additionally, the pneumatic spring can be configured to selectively function as a pneumatic actuator by controlling the valves 424, 425 to move the piston within the chamber. When thus utilized, the pneumatic actuator can serve to supplement the primary actuator 412. The pneumatic spring can also be configured to facilitate free movement of the piston, by control of the valves, to selectively disengage the pneumatic spring/actuator/damper. Coordinated operation of the valves 424, 425 can therefore control the pneumatic spring to function in a variety of ways. The pneumatic spring and valve configuration, along with the actuator, can perform functions similar to those described above with reference to FIGS. 2A and 2B. For example, the hydraulic actuator and the pneumatic spring can both be disengaged to facilitate free movement of support members relative to one another, such as during a swing phase of a walking gait. The use of fluids in a hydraulic actuator and a pneumatic spring can therefore facilitate dynamic recruiting and tuning (e.g., energy input capability), to optimally provide potential energy storage/recovery and actuation consistent with any given application or demand scenario.

As with FIG. 2B, the configuration of FIG. 2C can be used to allow potential energy to be stored and recovered during part of a gait cycle, and permit support members to follow a quasi-ballistic (passive dynamics) torque versus joint angle trajectory (e.g. during leg swing). In one aspect, spring characteristics, damping characteristics, and/or energy input/extraction can be tunable to achieve a desired result in a single gait cycle. Although this configuration can be utilized at any suitable location, this configuration can be utilized effectively for degrees of freedom corresponding to knee flexion/extension and/or hip flexion/extension due to the ease of dynamically tuning compliance with this configuration. FIG. 2C also illustrates an additional or alternative potential energy storage mechanism 413', which may be of any suitable configuration described herein, arranged in series with the actuator 412. Thus, potential energy storage mechanisms can be arranged in series and/or in parallel with an actuator at any given joint.

In one aspect, the actuator and potential energy storage mechanism disclosed herein can provide the ability to adapt to any given situation or loading scenario by dynamically altering the characteristics of the combination of damping, energy storage/recovery, and actuation to create an optimal load-carrying capability for the legged robotic device. Accordingly, control policies and software can be utilized that can take advantage of the energy recovery, and power reduction capabilities of actuator and potential energy storage mechanisms of the legged robotic device.

FIGS. 3A-3C illustrate several examples of valve arrangements that can be used to control hydraulic and/or pneumatic components of a legged robotic device as disclosed herein. Other valve configurations and arrangements are possible and it should be recognized that any suitable valve configuration or arrangement may be utilized. FIG. 3A illustrates a configuration utilizing a pair of three-way valves 520, 521 to control fluid flow between a pressure source and return and to opposite A and B sides of a piston in a chamber. In this case, the three-way valves 520, 521 can supply pressurized fluid as desired to the A and/or B sides of a hydraulic actuator or a pneumatic potential energy storage mechanism. The three-way valves 520, 521 can also control fluid flow from the A and B sides to provide damping, modify a zero position of the potential energy storage mechanism, facilitate disengagement of the actuator or potential energy storage mechanism to facilitate free swinging of support members, etc.

FIG. 3B illustrates a configuration utilizing a pair of three-way valves 620, 621 and a two-way valve 622 to control fluid flow between a pressure source and return and to opposite A and B sides of a piston in a chamber. This configuration is similar to the configuration illustrated in FIG. 3A, with the addition of the two-way valve 622. Thus, the three-way valves 620, 621 can supply pressurized fluid as desired to the A and/or B sides of a hydraulic actuator or a pneumatic potential energy storage mechanism. In this case, by closing the three-way valves 620, 621, the two-way valve 622 can facilitate fluid movement between the A and B sides to provide damping, modify a zero position of the potential energy storage mechanism, facilitate disengagement of the actuator or potential energy storage mechanism to facilitate free swinging of support members, etc.

FIG. 3C illustrates a configuration utilizing a four-way valve 723 and a two-way valve 722 to control fluid flow between a pressure source and return and to opposite A and B sides of a piston in a chamber. In this case, the four-way valve 723 can supply pressurized fluid as desired to the A and/or B sides of a hydraulic actuator or a pneumatic potential energy storage mechanism (e.g., a pneumatic actuator that can also act as a potential energy storage mechanism). In this case, by closing the four-way valve 723, the two-way valve 722 can facilitate fluid movement between the A and B sides to provide damping, modify a zero position of the potential energy storage mechanism, facilitate disengagement of the actuator or potential energy storage mechanism to facilitate free swinging of support members, etc.

Each of these valve configurations can allow fluid to be shunted in a controlled way, such that support members are capable of swinging freely. In addition, these valve configurations can facilitate locking support members relative to one another, dissipating energy in a controlled way (i.e., by acting as a damper), and/or storing energy in a potential energy storage mechanism, without drawing power from the pressurized fluid supply, which is unlike a traditional four-way valve used to modulate power/fluid flow in a hydraulically actuated joint where work is done by the pressurized fluid supply to accelerate or decelerate support members about a joint. Thus, an advantage of the valve configurations disclosed herein is that the natural dynamics of the robotic device can be utilized to reduce power usage. Another advantage of the valve configurations disclosed herein is that an actuator can be recruited in real-time with the valves acting as a digital transmission, which can also contribute to improving power efficiency.

Figure 4:
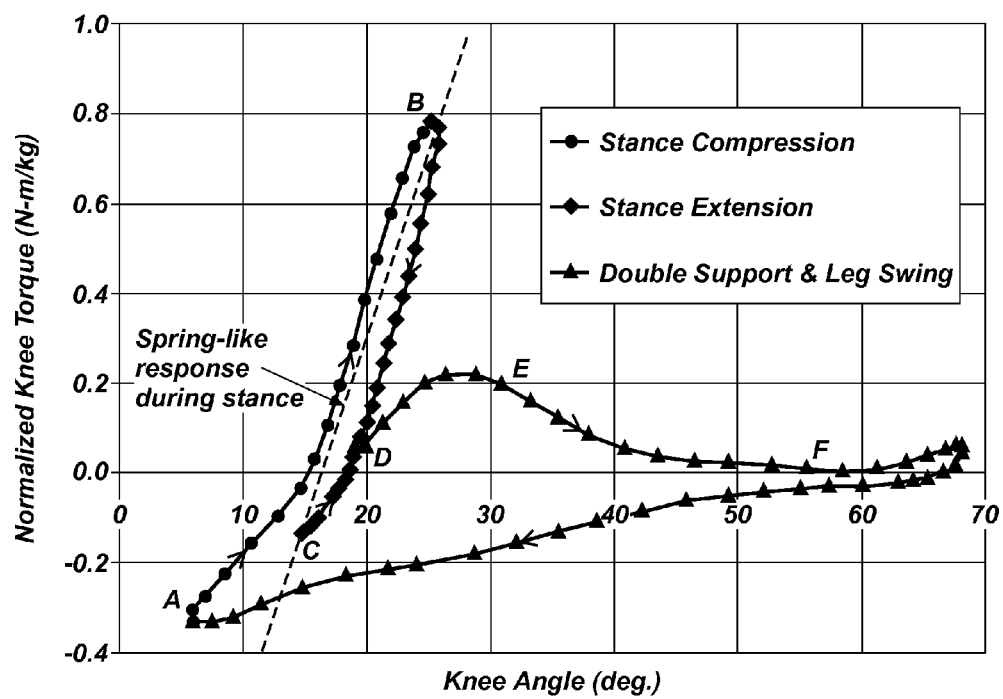
FIG. 4 is a graph of a typical human walking gait cycle for the knee joint showing the relationship between knee torque and knee angle.

FIG. 4 is a graph of a typical human walking gait cycle for the knee joint, in particular, the relationship between knee torque and knee angle (see, e.g., K. Shamaei, G. S. Sawichi, and P. M. Dollar, PLOS ONE, Vol. 8(3):e59993 (2013)). The start and end point at A corresponds to successive heel strike of the same foot. During the stance phase, the joint torque versus joint angle has a spring-like behavior with the knee acting as a shock absorber, while during the swing phase the knee has a quasi-ballistic (passive dynamics) response with some damping during the final extension that take place before heel strike. During the stance phase (from heel strike at point A to toe-roll/terminal stance at point D) the torque-joint profile has a quasi-elastic behavior. The dynamic stiffness changes with load and walking or running speed, but the spring-like behavior is qualitatively preserved. During the swing phase of the walk cycle (from roll/terminal stance at point D to heel strike at point A), the trajectory is quasi-ballistic and the knee primarily acts as a controlled damper. The technology disclosed herein can be configured to exploit these features to minimize demands on the powered actuators, and to reduce overall power usage. For example, an actuator and/or can exploit the quasi-elastic response of the knee during the stance phase of walking, and other unique characteristics of hip and thigh joints to create an actuation system that is lightweight and efficient. A degree of freedom corresponding to knee flexion/extension can include a tunable potential energy storage mechanism that operates in parallel with a primary (tunable) hydraulic actuator, such as is illustrated in FIGS. 2B and 2C discussed above, and can operate in a manner similar to the walking gait cycle illustrated in FIG. 4. For example, the potential energy storage mechanism and hydraulic actuator can be dynamically tuned or adjusted to provide the spring-like behavior characteristics of the stance phase, as well as the free-swinging and damping characteristics of the swing phase.

Figures 5A, 5B:
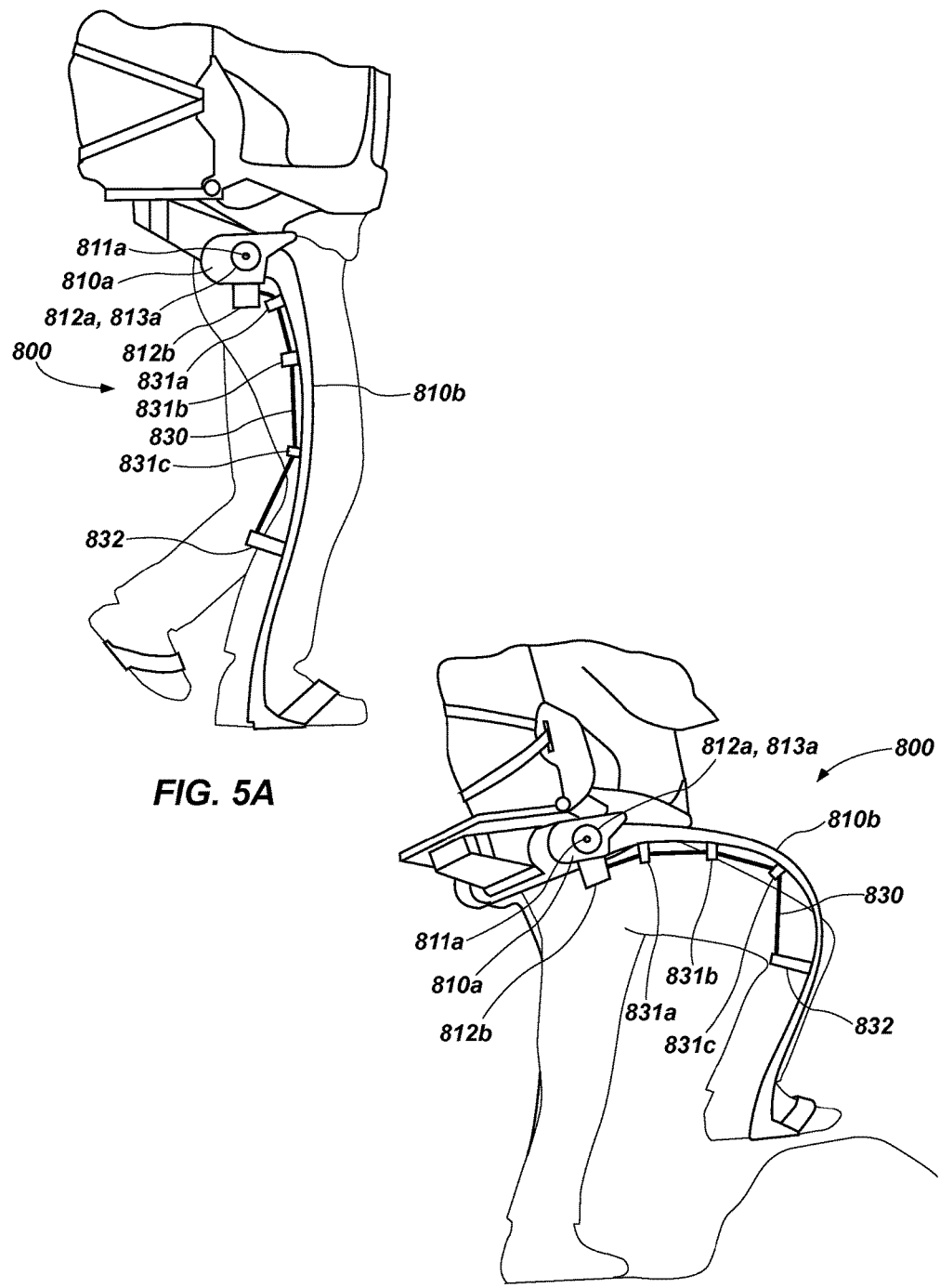
FIGS. 5A and 5B are illustrations of a legged robotic device in accordance with another example of the present disclosure.

FIGS. 5A and 5B illustrate a legged robotic device 800 in accordance with another example of the present disclosure. The legged robotic device 800 can include a support member 810a coupled to a support member 810b for relative movement defining a degree of freedom corresponding to a degree of freedom of a hip of a human leg. For example, the support members 810a, 810b can be rotatably coupled together defining a rotational degree of freedom about axis 811a, which can correspond to a hip flexion/extension degree of freedom. The legged robotic device 800 can also include an actuator 812a to apply a torque to the support members 810a, 810b in the degree of freedom about the axis 811a. In addition, a potential energy storage mechanism 813a can be associated with the degree of freedom about the axis 811a and operable to store potential energy as a result of relative movement of the support members 810a, 810b in the degree of freedom and to provide at least a portion of the stored potential energy to the support members 810a, 810b as a compensating torque to assist the actuator 812a. A spring rate and/or a zero position of the potential energy storage mechanism 813a can be dynamically variable. In one aspect, the support member 810b can be resiliently flexible sufficient to form a degree of freedom corresponding to a degree of freedom of a knee of a human leg, such as knee flexion/extension. The resiliently flexible support member 810b can be operable to store potential energy as a result of bending the support member 810b and to provide at least a portion of the stored potential energy to straighten the support member 810b.

In one aspect, the resiliently flexible support member 810b can serve as a potential energy storage mechanism in the form of a bendable spring (bow spring), which can extend from the hip joint (where it is coupled thereto) down to underneath the foot capable of supporting a vertical load and transferring the vertical load through the bottom underneath the foot. In one aspect, the resiliently flexible support member 810b can have a forward pre-bend to facilitate bending in a desired direction and at a desired location, such as proximate the user's knee. In an upright position or non-energized state, the user or wearer would not feel the load as the load is transferred through the support member 810b or potential energy storage mechanism to the ground. As the support member 810b or potential energy storage mechanism is energized (e.g., when the wearer bends down), energy is put into the potential energy storage mechanism. Upon release, or upon the user standing upright, the energy is recovered, and put back into the load. This is one example of a situation where a potential energy storage mechanism can be used to reduce the amount of work done by the robotic device. In other words, the user is using his gravity induced weight to put energy into the potential energy storage mechanism. When it is desired to get the energy back, the user stands or otherwise moves to de-energize the potential energy storage mechanism so now the amount of work the user needs to do is reduced by the amount of energy put into the potential energy storage mechanism.

In one aspect, the legged robotic device 800 can include a tendon 830, such as a cable, coupled to the resiliently flexible support member 810b via a series of eyelets 831a-c and terminating at a leverage arm 832 extending from the resiliently flexible support member 810b. The tendon 830 can be coupled to an actuator 812b located proximate the hip of the user and/or the actuator 812a. The actuator 812b can be any suitable type of actuator as described herein. The actuator 812b can pull on the tendon 830, which can in turn pull on the leverage arm 832 to produce a torque that can bend the resiliently flexible support member 810b in a degree of freedom corresponding to knee flexion/extension. Thus, the number and location of the eyelets 831a-c, and the length and location of the leverage arm 832 can be selected to produce a desired amount of bending of the resiliently flexible support member 810b for a given amount of tension in the tendon 830 and to cause bending of the resiliently flexible support member 810b at a desired location.

In accordance with one embodiment of the present invention, a method for providing a compensating torque to assist an actuator of a legged robotic device is disclosed. The method can comprise providing a plurality of support members coupled together for relative movement defining a plurality of degrees of freedom, at least one of the plurality of degrees of freedom corresponding to at least one degree of freedom of a human leg. The method can also comprise providing an actuator to apply a force or a torque to the support members in the at least one of the plurality of degrees of freedom. Additionally, the method can comprise providing a potential energy storage mechanism associated with the at least one of the plurality of degrees of freedom operable to store potential energy as a result of relative movement of the support members in the at least one of the plurality of degrees of freedom and to provide at least a portion of the stored potential energy to the support members as a compensating force or torque to assist the actuator, wherein at least one of a spring rate and a zero position of the potential energy storage mechanism is dynamically variable. It is noted that no specific order is required in this method, though generally in one embodiment, these method steps can be carried out sequentially.

In one aspect of the method, the actuator can be undersized for a maximum load requirement without the existence of the potential energy storage mechanism. In another aspect of the method, the at least one degree of freedom of the human leg can comprise at least one of hip flexion/extension, hip abduction/adduction, hip medial/lateral rotation, knee flexion/extension, ankle flexion/extension, ankle inversion/eversion, and ankle medial/lateral rotation. In yet another aspect of the method, the potential energy storage mechanism can comprise a tension spring, a compression spring, a torsion spring, a spiral torsion spring, a pneumatic spring, a cantilever spring, a constant force spring, a negator spring, an elastomeric material, a volute spring, a coil spring, a flat spring, a bow spring, or a combination thereof.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A legged robotic device, comprising:
   a plurality of support members coupled together for relative movement defining a plurality of degrees of freedom, at least one of the plurality of degrees of freedom corresponding to at least one degree of freedom of a human leg;
   an actuator to apply a force or a torque to the support members in the at least one of the plurality of degrees of freedom; and
   a potential energy storage mechanism in the form of a spring associated with the at least one of the plurality of degrees of freedom operable to store potential energy as a result of relative movement of the support members in the at least one of the plurality of degrees of freedom and to provide at least a portion of the stored potential energy to the support members as a compensating force or torque to assist the actuator, wherein at least one of a spring rate or a zero position of the potential energy storage mechanism is dynamically variable; and
   a clutch arranged in series with the potential energy storage mechanism to selectively engage and disengage the potential energy storage mechanism,
   wherein the actuator is operable in a freely moveable state to selectively disengage the actuator, and wherein selective disengagement of the potential energy storage mechanism and the actuator facilitates free relative movement of the support members in the at least one of the plurality of degrees of freedom.

2. The legged robotic device of claim 1, wherein the actuator is undersized for a maximum load requirement without the existence of the potential energy storage mechanism.

3. The legged robotic device of claim 1, wherein the at least one degree of freedom of the human leg comprises at least one of hip flexion/extension, hip abduction/adduction, hip medial/lateral rotation, knee flexion/extension, ankle flexion/extension, ankle inversion/eversion, and ankle medial/lateral rotation.

4. The legged robotic device of claim 1, wherein the actuator comprises a hydraulic actuator, a pneumatic actuator, an electric actuator, or a combination thereof.

5. The legged robotic device of claim 1, wherein the actuator and the potential energy storage mechanism are arranged in parallel.

6. The legged robotic device of claim 1, wherein the actuator comprises a hydraulic actuator.

7. The legged robotic device of claim 6, wherein the hydraulic actuator is configured to selectively function as a hydraulic damper.

8. The legged robotic device of claim 6, wherein the hydraulic actuator is configured to facilitate free movement of a piston of the hydraulic actuator to selectively disengage the hydraulic actuator, and wherein selective disengagement of the potential energy storage mechanism and the hydraulic actuator facilitate free relative movement of the support members in the at least one of the plurality of degrees of freedom.

9. The legged robotic device of claim 6, wherein the potential energy storage mechanism comprises a pneumatic spring configured to facilitate free movement of a piston of the pneumatic spring to selectively disengage the pneumatic spring, wherein the hydraulic actuator is configured to facilitate free movement of a piston of the hydraulic actuator to selectively disengage the hydraulic actuator, and wherein selective disengagement of the pneumatic spring and the hydraulic actuator facilitate free relative movement of the support members in the at least one of the plurality of degrees of freedom.

10. The legged robotic device of claim 9, wherein free movement of at least one of the piston of the pneumatic spring and the piston of the hydraulic actuator is controlled by at least one valve.

11. The legged robotic device of claim 1, wherein the potential energy storage mechanism comprises a pneumatic spring configured to selectively function as at least one of a pneumatic actuator and a pneumatic damper.

12. The legged robotic device of claim 11, wherein the pneumatic spring is configured to facilitate varying at least one of a spring rate, a zero position, and a preload.

13. The legged robotic device of claim 1, wherein the potential energy storage mechanism comprises a spring.

14. The legged robotic device of claim 13, wherein the spring comprises a tension spring, a compression spring, a torsion spring, a spiral torsion spring, a pneumatic spring, a cantilever spring, a constant force spring, a negator spring, an elastomeric material, a volute spring, a coil spring, a flat spring, a bow spring, a hydraulic accumulator, a magnetic sprin, or a combination thereof.

15. The legged robotic device of claim 13, wherein a preload on the spring is dynamically variable.

16. The legged robotic device of claim 1, further comprising a damper to resist movement of the support members in the one or more degrees of freedom.

17. The legged robotic device of claim 16, wherein the damper comprises at least one of a hydraulic damper, a pneumatic damper, a mechanical damper, an electrical damper, or a combination thereof.

18. The legged robotic device of claim 16, wherein a damping coefficient of the damper is dynamically variable.

19. The legged robotic device of claim 1, further comprising a power source supported about the robotic device to power the actuator.

20. The legged robotic device of claim 1, wherein the legged robotic device is configured as an exoskeleton structure for attachment to a human body.

21. The legged robotic device of claim 1, wherein the legged robotic device is configured as a humanoid robot.

22. A legged robotic device, comprising:
a first support member coupled to a second support member for relative movement defining a first degree of freedom corresponding to a degree of freedom of a knee of a human leg;
a first actuator to apply a force or a torque to the first and second support members in the first degree of freedom;
a first potential energy storage mechanism in the form of a spring associated with the first degree of freedom operable to store potential energy as a result of relative movement of the first and second support members in the first degree of freedom and to provide at least a portion of the stored potential energy to the first and second support members as a compensating force or torque to assist the first actuator, wherein at least one of a spring rate and a zero position of the first potential energy storage mechanism is dynamically variable;
a third support member coupled to the second support member for relative movement defining a second degree of freedom corresponding to a degree of freedom of a hip of a human leg;
a second actuator to apply a force or a torque to the second and third support members in the second degree of freedom;
a second potential energy storage mechanism in the form of a spring associated with the second degree of freedom operable to store potential energy as a result of relative movement of the second and third support members in the second degree of freedom and to provide at least a portion of the stored potential energy to the second and third support members as a compensating force or torque to assist the second actuator;
a fourth support member coupled to the third support member for relative movement defining a third degree of freedom corresponding to a second degree of freedom of the hip;
a third actuator to apply a force or a torque to the third and fourth support members in the third degree of freedom; and
a third potential energy storage mechanism in the form of a spring associated with the third degree of freedom operable to store potential energy as a result of relative movement of the third and fourth support members in the third degree of freedom and to provide at least a portion of the stored potential energy to the third and fourth support members as a compensating force or torque to assist the third actuator.

23. The legged robotic device of claim 22, wherein the degree of freedom of the hip comprises at least one of hip flexion/extension, hip abduction/adduction, and hip medial/lateral rotation.

24. The legged robotic device of claim 22, further comprising:
a fifth support member coupled to the fourth support member for relative movement defining a fourth degree of freedom corresponding to a third degree of freedom of the hip;
a fourth actuator to apply a force or a torque to the fourth and fifth support members in the fourth degree of freedom; and
a fourth potential energy storage mechanism in the form of a spring associated with the fourth degree of freedom operable to store potential energy as a result of relative movement of the fourth and fifth support members in the fourth degree of freedom and to provide at least a portion of the stored potential energy to the fourth and fifth support members as a compensating torque to assist the fourth actuator.

25. A legged robotic device, comprising:
a first support member coupled to a second support member for relative movement defining a first degree of freedom corresponding to a degree of freedom of a hip of a human leg;
a first actuator to apply a torque to the first and second support members in the first degree of freedom;
a first potential energy storage mechanism in the form of a spring associated with the first degree of freedom operable to store potential energy as a result of relative movement of the first and second support members in the first degree of freedom and to provide at least a portion of the stored potential energy to the first and second support members as a compensating torque to assist the first actuator, wherein at least one of a spring rate and a zero position of the first potential energy storage mechanism is dynamically variable,
wherein the second support member is resiliently flexible sufficient to form a second degree of freedom corresponding to a degree of freedom of a knee of a human leg, and wherein the resiliently flexible second support member is operable to store potential energy as a result of bending the second support member and to provide at least a portion of the stored potential energy to straighten the second support member.

26. A method for providing a compensating torque to assist an actuator of a legged robotic device, comprising:
providing a plurality of support members coupled together for relative movement defining a plurality of degrees of freedom, at least one of the plurality of degrees of freedom corresponding to at least one degree of freedom of a human leg;

providing an actuator to apply a force or a torque to the support members in the at least one of the plurality of degrees of freedom;

providing a potential energy storage mechanism in the form of a spring associated with the at least one of the plurality of degrees of freedom operable to store potential energy as a result of relative movement of the support members in the at least one of the plurality of degrees of freedom and to provide at least a portion of the stored potential energy to the support members as a compensating force or torque to assist the actuator, wherein at least one of a spring rate and a zero position of the potential energy storage mechanism is dynamically variables;

providing a clutch arranged in series with the potential energy storage mechanism to selectively engage and disengage the potential energy storage mechanism, wherein the actuator is operable in a freely moveable state to selectively disengage the actuator, and wherein selective disengagement of the potential energy storage mechanism and the actuator facilitates free relative movement of the support members in the at least one of the plurality of degrees of freedom.

27. The method of claim 26, wherein the actuator is undersized for a maximum load requirement without the existence of the potential energy storage mechanism.

28. The method of claim 26, wherein the at least one degree of freedom of the human leg comprises at least one of hip flexion/extension, hip abduction/adduction, hip medial/lateral rotation, knee flexion/extension, ankle flexion/extension, ankle inversion/eversion, and ankle medial/lateral rotation.

29. The method of claim 26, wherein the spring comprises a tension spring, a compression spring, a torsion spring, a spiral torsion spring, a pneumatic spring, a cantilever spring, a constant force spring, a negator spring, an elastomeric material, a volute spring, a coil spring, a flat spring, a bow spring, or a combination thereof.

30. A legged robotic device, comprising:

a plurality of support members coupled together for relative movement defining a plurality of degrees of freedom, at least one of the plurality of degrees of freedom corresponding to at least one degree of freedom of a human leg;

an actuator to apply a force or a torque to the support members in the at least one of the plurality of degrees of freedom;

a pneumatic spring associated with the at least one of the plurality of degrees of freedom operable to store potential energy as a result of relative movement of the support members in the at least one of the plurality of degrees of freedom and to provide at least a portion of the stored potential energy to the support members as a compensating force or torque to assist the actuator, wherein at least one of a spring rate or a zero position of the pneumatic spring is dynamically variable, wherein the pneumatic spring is configured to facilitate free movement of a piston of the pneumatic spring to selectively disengage the pneumatic spring, wherein the actuator is operable in a freely moveable state to selectively disengage the actuator, and wherein selective disengagement of the pneumatic spring and the actuator facilitate free relative movement of the support members in the at least one of the plurality of degrees of freedom.

31. A legged robotic device, comprising:

a plurality of support members coupled together for relative movement defining a plurality of degrees of freedom, at least one of the plurality of degrees of freedom corresponding to at least one degree of freedom of a human leg;

an actuator to apply a force or a torque to the support members in the at least one of the plurality of degrees of freedom;

a pneumatic spring associated with the at least one of the plurality of degrees of freedom operable to store potential energy as a result of relative movement of the support members in the at least one of the plurality of degrees of freedom and to provide at least a portion of the stored potential energy to the support members as a compensating force or torque to assist the actuator, wherein the pneumatic spring is configured to selectively function as at least one of a pneumatic actuator and a pneumatic damper, and wherein the pneumatic spring is configured to facilitate varying at least one of a spring rate, a zero position, or a preload of the pneumatic spring.

* * * * *